US012679988B2

(12) United States Patent
Takeda et al.

(10) Patent No.: US 12,679,988 B2
(45) Date of Patent: Jul. 14, 2026

(54) INK SET, INKJET RECORDING METHOD, INK MEDIUM SET, AND PRINTING MEDIUM

(71) Applicant: Nippon Kayaku Kabushiki Kaisha, Tokyo (JP)

(72) Inventors: Michiaki Takeda, Tokyo (JP); Ha Sai, Tokyo (JP); Shogo Toda, Tokyo (JP); Hirotoshi Takahashi, Tokyo (JP); Yuri Nakagawa, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/546,415

(22) PCT Filed: Mar. 25, 2022

(86) PCT No.: PCT/JP2022/014385
§ 371 (c)(1),
(2) Date: Aug. 14, 2023

(87) PCT Pub. No.: WO2022/203041
PCT Pub. Date: Sep. 29, 2022

(65) Prior Publication Data

US 2024/0182736 A1 Jun. 6, 2024

(30) Foreign Application Priority Data

Mar. 26, 2021 (JP) ................................ 2021-052731

(51) Int. Cl.
*C09D 11/40* (2014.01)

(52) U.S. Cl.
CPC .................................... *C09D 11/40* (2013.01)

(58) Field of Classification Search
CPC ....... C09D 11/322; C09D 11/38; C09D 11/54; C09D 11/40; C09D 11/30; C09D 11/033; C09D 11/107; C09D 11/326; B41M 5/0017; B41M 5/0011; B41M 5/0023; B41M 5/0064; B41M 5/0047; D06P 5/30; B41J 11/002; B41J 11/2107; C08K 5/0041
See application file for complete search history.

(56) References Cited

U.S. PATENT DOCUMENTS

2010/0214352 A1* 8/2010 Tsunoda .................... D06P 5/30 524/386
2013/0038659 A1 2/2013 Kaneko et al.
2013/0307899 A1* 11/2013 Saito ......................... C09C 1/56 347/21
2014/0104341 A1 4/2014 Yano et al.
2017/0037249 A1* 2/2017 Oguchi ..................... D06P 1/16
2017/0355868 A1* 12/2017 Saiga ..................... C09D 11/40
2018/0001669 A1 1/2018 Furukawa et al.
2018/0187034 A1 7/2018 Takeno et al.
2018/0273780 A1 9/2018 Ito
2020/0283650 A1 9/2020 Koganehira et al.
2021/0071026 A1* 3/2021 Toeda .................. C09D 11/322

FOREIGN PATENT DOCUMENTS

| | | | |
|---|---|---|---|
| CN | 108624141 | A | 10/2018 |
| CN | 109659067 | A | 4/2019 |
| CN | 111893785 | A | 11/2020 |
| EP | 3 378 909 | A1 | 9/2018 |
| JP | 2012-136573 | A | 7/2012 |
| JP | 2013-189597 | A | 9/2013 |
| JP | 2013-189598 | A | 9/2013 |
| JP | 2014-139004 | A | 7/2014 |
| JP | 2016-044188 | A | 4/2016 |
| JP | 2017-008319 | A | 1/2017 |
| JP | 2017-226743 | A | 12/2017 |
| JP | 2018-192779 | A | 12/2018 |
| JP | 2020-125437 | A | 8/2020 |
| WO | WO 2011/136000 | A1 | 11/2011 |
| WO | WO 2012/024130 | A2 | 2/2012 |
| WO | WO 2014/098001 | A1 | 6/2014 |
| WO | WO 2015/012132 | A1 | 1/2015 |

OTHER PUBLICATIONS

Office Action issued in corresponding Chinese Patent Application No. 202280022652.8, dated Jan. 18, 2025, in 14 pages.
Extended European Search Report dated May 7, 2025 in European Patent Application No. 22775822.4.

* cited by examiner

*Primary Examiner* — John P Zimmermann
(74) *Attorney, Agent, or Firm* — Knobbe, Martens, Olson & Bear, LLP

(57) ABSTRACT

An ink set which includes a first ink composition that contains a coloring agent, a surfactant in an amount of A1 mass %, a hydrophobic organic solvent in an amount of A2 mass %, and water, the first ink composition being used to form a first image, and a second ink composition that contains a coloring agent, a surfactant in an amount of B1 mass %, a hydrophobic organic solvent in an amount of B2 mass %, and water, the second ink composition being used to form a second image on the first image. The surfactant is a specific silicone-based surfactant; the octanol/water partition coefficient of the hydrophobic organic solvent is not less than 2.00 but less than 3.50; and the following formula $0.05 \leq (0.5 \times (B1-A1)+(B2-A2)) \leq 0.70$ is satisfied.

9 Claims, No Drawings

INK SET, INKJET RECORDING METHOD, INK MEDIUM SET, AND PRINTING MEDIUM

This application is the U.S. National Phase under 35 U.S.C. § 371 of International Application PCT/JP2022/014385, filed Mar. 25, 2022, designating the U.S., and published in Japanese as WO 2022/203041 on Sep. 29, 2022, which claims priority to Japanese Patent Application No. 2021-052731, filed Mar. 26, 2021, the entire content of which are incorporated herein by reference.

TECHNICAL FIELD

The present invention relates to an ink set, an inkjet printing method, an ink and medium set, and a printed medium.

BACKGROUND ART

A printing method with an inkjet printer (inkjet printing method), which is representative of various color printing methods, involves generating small droplets of ink, and attaching the droplets to a printing medium such as a piece of paper to achieve printing. In recent years, demand for the inkjet printing method for industrial applications has increased, and inks which allow for printing on various printing media have been required.

For non-ink-absorbent media and less ink-absorbent media (hereinafter, may also be referred to as "non- or less ink-absorbent media") among the printing media, inks which exhibit favorable wetting and spreading on the media are desired. This is because favorable wetting and spreading on the media lead to a wider area to be colored per a certain amount of ink droplets (in other words, larger diameters of ink dots), resulting in a reduction of the amount of ink consumed. However, non- or less ink-absorbent media are more resistant to wetting and spreading of inks as compared with ink-absorbent media, and generally tend to result in smaller diameters of ink dots. Thus, an improvement in the wetting and spreading properties of inks has been required, and some types of inks aiming at satisfying such a requirement have been proposed. For example, Patent Documents 1 to 3 disclose inks which exhibit improved wetting and spreading properties for non- or less ink-absorbent media by the incorporation of a specific organic solvent and/or surfactant.

Further, color printing involves the use of an ink set including a plurality of inks with different colors. It is known that in the color printing using such an ink set, the landing position of an ink with a first color and the landing position of an ink with a second color are adjacent to each other on a printing medium, and this may cause bleeding at the interface between the first color and the second color. This intercolor bleeding is one of factors which seriously deteriorate the printing quality. Therefore, elimination of this intercolor bleeding has been sought, and an ink for solving this problem has been proposed. For example, Patent Document 4 discloses an ink which contains a polyalkoxylate of acetylene glycol-based surfactant and gives a high-quality image without color unevenness or intercolor bleeding even for non- or less ink-absorbent media.

Patent Document 1: Japanese Unexamined Patent Application, Publication No. 2016-044188

Patent Document 2: Japanese Unexamined Patent Application, Publication No. 2014-139004

Patent Document 3: PCT International Publication No. WO2011/136000

Patent Document 4: Japanese Unexamined Patent Application, Publication No. 2012-136573

DISCLOSURE OF THE INVENTION

Problems to be Solved by the Invention

However, the studies by the present inventors revealed that the problem of the intercolor bleeding involves complex factors as follows.

In the early stage of printing, a combination of an ink with a first color and an ink with a second color both of which have recently been produced (in other words, both are fresh) can be used for the printing. Accordingly, the selective use of an ink set which addresses the intercolor bleeding enables high-quality printing with suppressed intercolor bleeding.

However, the continued printing results in the difference in consumption amount between the inks in the ink set, depending on the types of the colors of the inks. Thus, a more consumed ink is replaced earlier by a new one when it runs out. On the other hand, a less consumed ink is continued to be used for a longer period of time until the initially installed ink runs out. As a result, a fresher ink and an older ink will be used in combination. The difference in storage period before use between the more consumed ink and the less consumed ink may amount to several months to about one year. Printing with inks having different storage periods in combination may result in severe intercolor bleeding and deterioration in quality of printed image despite no drastic change in storage stability (various physical properties such as ejectability, mean particle size, viscosity, and pH) of each ink itself.

The present invention has been made in view of the circumstances described above, and an object of the present invention is to provide an ink set which minimizes intercolor bleeding regardless of the storage period of each ink composition therein, an inkjet printing method using the ink set, an ink and medium set including the ink set and a printing medium, and a printed medium printed using the ink set.

Means for Solving the Problems

Specific means for solving the aforementioned problems include the following embodiments.

A first aspect of the present invention relates to an ink set including:

- a first ink composition containing a first colorant, a first surfactant, a first hydrophobic organic solvent, and water; and
- a second ink composition containing a second colorant, a second surfactant, a second hydrophobic organic solvent, and water, and applied to a first image formed using the first ink composition to form a second image,
- wherein,
- the first and second surfactants are each independently a silicone-based surfactant represented by the following formula (1):

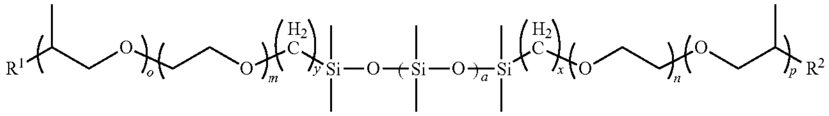

(1)

wherein in the formula (1), $R^1$ and $R^2$ each independently represent a hydrogen atom, a hydroxy group, an alkyl group having 1 to 6 carbon atoms, or an alkoxy group having 1 to 3 carbon atoms, a is an integer of 1 to 80, x and y are each independently an integer of 1 to 4, m and n are each independently an integer of 1 to 50, o and p are each independently an integer of 0 to 40, the sum of m and n is 2 to 100, and the sum of o and p is 0 to 80, the first and second hydrophobic organic solvents each have a water-octanol partition coefficient of 2.00 or more and less than 3.50, and when the content of the first surfactant in the first ink composition is designated as A1 (% by mass), the content of the first hydrophobic organic solvent in the first ink composition is designated as A2 (% by mass), the content of the second surfactant in the second ink composition is designated as B1 (% by mass), and the content of the second hydrophobic organic solvent in the second ink composition is designated as B2 (% by mass), the condition expressed by the following inequation (2) is satisfied:

$$0.05\leq[0.5\times(B1-A1)+(B2-A2)]\leq0.70 \quad (2).$$

A second aspect of the present invention relates to the ink set according to the first aspect, wherein in the formula (1), m and n are each independently an integer of 1 to 30.

An eighth aspect of the present invention relates to an ink and medium set including the ink set according to any one of the first to sixth aspects, and a printing medium.

A ninth aspect of the present invention relates to a printed medium including a first image formed by applying the first ink composition included in the ink set according to any one of the first to sixth aspects, and a second image formed on the first image by applying the second ink composition included in the ink set.

A tenth aspect of the present invention relates to an ink composition forming a first image, and used with an ink composition applied to the first image to form a second image, wherein the ink composition forming the first image contains a first colorant, a first surfactant, a first hydrophobic organic solvent, and water, the ink composition forming the second image contains a second colorant, a second surfactant, a second hydrophobic organic solvent, and water, the first and second surfactants are each independently a silicone-based surfactant represented by the following formula (1):

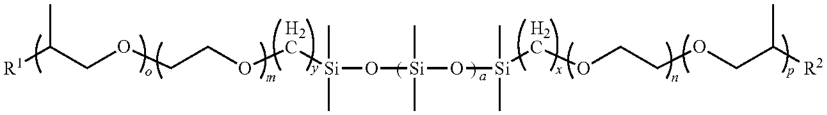

(1)

A third aspect of the present invention relates to the ink set according to the first or second aspect, wherein one or both of the first ink composition and the second ink composition contain a binder.

A fourth aspect of the present invention relates to the ink set according to the third aspect, wherein the binder is at least one selected from a wax or a (meth)acrylic polymer.

A fifth aspect of the present invention relates to the ink set according to the fourth aspect, wherein the wax is at least one selected from a polyalkylene wax, an oxidized polyalkylene wax, or a paraffin wax.

A sixth aspect of the present invention relates to the ink set according to the fourth or fifth aspect, wherein the wax is an oxidized polyethylene wax.

A seventh aspect of the present invention relates to an inkjet printing method using the ink set according to any one of the first to sixth aspects, the method including:

ejecting droplets of the first ink composition, and attaching the droplets to a printing medium to form a first image; and ejecting droplets of the second ink composition, and attaching the droplets to the printing medium having the first image formed thereon to form a second image.

wherein in the formula (1), $R^1$ and $R^2$ each independently represent a hydrogen atom, a hydroxy group, an alkyl group having 1 to 6 carbon atoms, or an alkoxy group having 1 to 3 carbon atoms, a is an integer of 1 to 80, x and y are each independently an integer of 1 to 4, m and n are each independently an integer of 1 to 50, o and p are each independently an integer of 0 to 40, the sum of m and n is 2 to 100, and the sum of o and p is 0 to 80, the first and second hydrophobic organic solvents each have a water-octanol partition coefficient of 2.00 or more and less than 3.50, and when the content of the first surfactant in the ink composition forming the first image is designated as A1 (% by mass), the content of the first hydrophobic organic solvent in the ink composition forming the first image is designated as A2 (% by mass), the content of the second surfactant in the ink composition forming the second image is designated as B1 (% by mass), and the content of the second hydrophobic organic solvent in the ink composition forming the second image is designated as B2 (% by mass), the condition expressed by the following inequation (2) is satisfied:

$$0.05\leq[0.5\times(B1-A1)+(B2-A2)]\leq0.70 \quad (2).$$

An eleventh aspect of the present invention relates to an ink composition forming a second image, and used with an ink composition forming a first image having the second image formed thereon, wherein the ink composition forming the first image contains a first colorant, a first surfactant, a first hydrophobic organic solvent, and water the ink composition forming the second image contains a second colorant, a second surfactant, a second hydrophobic organic solvent, and water, the first and second surfactants are each independently a silicone-based surfactant represented by the following formula (1):

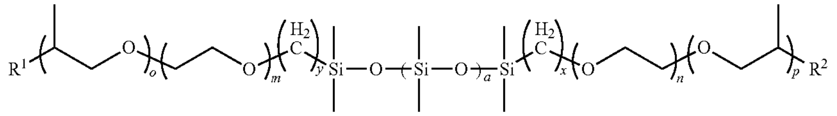

(1)

wherein in the formula (1), $R^1$ and $R^2$ each independently represent a hydrogen atom, a hydroxy group, an alkyl group having 1 to 6 carbon atoms, or an alkoxy group having 1 to 3 carbon atoms, a is an integer of 1 to 80, x and y are each independently an integer of 1 to 4, m and n are each independently an integer of 1 to 50, o and p are each independently an integer of 0 to 40, the sum of m and n is 2 to 100, and the sum of o and p is 0 to 80, the first and second hydrophobic organic solvents each have a water-octanol partition coefficient of 2.00 or more and less than 3.50, and when the content of the first surfactant in the ink composition forming the first image is designated as A1 (% by mass), the content of the first hydrophobic organic solvent in the ink composition forming the first image is designated as A2 (% by mass), the content of the second surfactant in the ink composition forming the second image is designated as B1 (% by mass), and the content of the second hydrophobic organic solvent in the ink composition forming the second image is designated as B2 (% by mass), the condition expressed by the following inequation (2) is satisfied:

$$0.05 \leq [0.5\times(B1-A1)+(B2-A2)] \leq 0.70 \quad (2).$$

Effects of the Invention

The present invention can provide an ink set which minimizes intercolor bleeding regardless of the storage period of each ink composition therein, an inkjet printing method using the ink set, an ink and medium set including the ink set and a printing medium, and a printed medium printed using the ink set.

PREFERRED MODE FOR CARRYING OUT THE INVENTION

Hereinafter, specific embodiments to which the present invention is applied will be described in detail. In this specification, "C.I." means "color index". Further, in this specification, the term "(meth)acryl" means both "acryl" and "methacryl". Similarly, the term "(meth)acrylate" means both "acrylate" and "methacrylate", and the term "(meth)acryloyl" means both "acryloyl" and "methacryloyl".

Ink Set

The ink set according to the present embodiment includes a first ink composition containing a first colorant, a first surfactant, a first hydrophobic organic solvent, and water, and a second ink composition containing a second colorant, a second surfactant, a second hydrophobic organic solvent, and water, and applied to a first image formed using the first ink composition to form a second image.

First Ink Composition

The first ink composition contains the first colorant, the first surfactant, the first hydrophobic organic solvent, and water, and may further contain other components. Examples of other components include a dispersing agent and an ink modifying agent. In the following, the components contained in the first ink composition will be described in detail. It should be noted that each component described below may be used alone or in combination of two or more types thereof.

[First Colorant]

A water-insoluble colorant is used as the first colorant. The water-insoluble colorant means a colorant having a solubility in water at 25° C. of usually 5 g/L or less, preferably 3 g/L or less, more preferably 1 g/L or less, and still more preferably 0.5 g/L or less. The lower limit of the solubility includes 0 g/L.

For example, a known pigment, disperse dye, solvent dye, and a water-insoluble resin colored with a colorant such as a dye or a pigment may be used as the first colorant. Of these, a pigment is preferred.

The pigment is exemplified by an inorganic pigment, an organic pigment, an extender pigment, etc.

Examples of the inorganic pigment include carbon blacks, metal oxides, metal hydroxides, metal sulfides, metal ferrocyanides, metal chlorides, etc. When the first ink composition is a black ink composition, and the first colorant is an inorganic pigment, the inorganic pigment is preferably carbon black such as thermal black, acetylene black, oil furnace black, gas furnace black, lamp black, gas black, and channel black. Specific examples of the carbon black include; Raven series from Columbia Carbon; Monarch series, Regal series, and Mogul series from Cabot Corporation; ColorBlack series, Printex series, SPECIALBLACK series, and Nerox series from Orion Engineered Carbons; MA series, MCF series, No. 25, No. 33, No. 40, No. 47, No. 52, No. 900, and No. 2300 from Mitsubishi Chemical Corporation; and the like.

Examples of the organic pigment include pigments of various types including azo, diazo, phthalocyanine, quinacridone, isoindolinone, dioxazine, perylene, perynone, thioindigo, anthraquinone, quinophtharone, etc. Specific examples of the organic pigment include: yellow pigments such as C.I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 180, 185, 193, 199, 202, and 213; red pigments such as C.I. Pigment Red 5, 7, 12, 48, 48:1, 57, 88, 112, 122, 123, 146, 149, 150, 166, 168, 177, 178, 179, 184, 185, 202, 206, 207, 254, 255, 257, 260, 264, and 272; blue pigments such as C.I. Pigment Blue 1, 2, 3, 15, 15:1, 15:2, 15:3, 15:4, 15:6, 16, 22, 25, 60, 66, and 80; violet pigments such as C.I. Pigment Violet 19, 23, 29, 37, 38, and 50; orange pigments such as C.I. Pigment Orange 13, 16, 68, 69, 71, and 73; green pigments such as C.I. Pigment Green 7, 36, and 54; black pigments such as C.I. Pigment Black 1; and the like.

Examples of the extender pigment include silica, calcium carbonate, talc, clay, barium sulfate, white carbon, etc. These extender pigments are often used in combination with another colorant.

The disperse dye is preferably a dye selected from C.I. Disperse. Specific examples of the disperse dye include: yellow dyes such as C.I. Disperse Yellow 9, 23, 33, 42, 49, 54, 58, 60, 64, 66, 71, 76, 79, 83, 86, 90, 93, 99, 114, 116, 119, 122, 126, 149, 160, 163, 165, 180, 183, 186, 198, 200, 211, 224, 226, 227, 231, and 237; red dyes such as C.I. Disperse Red 60, 73, 88, 91, 92, 111, 127, 131, 143, 145, 146, 152, 153, 154, 167, 179, 191, 192, 206, 221, 258, and 283; orange dyes such as C.I. Disperse Orange 9, 25, 29, 30, 31, 32, 37, 38, 42, 44, 45, 53, 54, 55, 56, 61, 71, 73, 76, 80, 96, and 97; violet dyes such as C.I. Disperse Violet 25, 27, 28, 54, 57, 60, 73, 77, 79, and 79:1; blue dyes such as C.I. Disperse Blue 27, 56, 60, 79:1, 87, 143, 165, 165:1, 165:2, 181, 185, 197, 202, 225, 257, 266, 267, 281, 341, 353, 354, 358, 364, 365, and 368; and the like.

The solvent dye is preferably a dye selected from C.I. Solvent.

The first colorant has an average particle size (D50) of usually 50 to 250 nm, and preferably 60 to 200 nm. As used herein, the average particle size (D50) denotes a particle size where the cumulative particle size distribution starting from the smaller particle size side in the particle size distribution determined by the laser diffraction/scattering reaches 50%.

The content of the first colorant is usually 1 to 30% by mass, preferably 1 to 10% by mass, and more preferably 2 to 7% by mass, based on the total mass of the first ink composition.

[Dispersing Agent]

The first ink composition preferably contains a dispersing agent to disperse the first colorant. The dispersing agent is not particularly limited, and any known dispersing agent such as a polymeric dispersing agent may be used. Examples of the polymeric dispersing agent include copolymers composed of at least two types of monomers (preferably, at least one of them being a hydrophilic monomer) selected from monomers such as: styrene and derivatives thereof; vinylnaphthalene and derivatives thereof; aliphatic alcohol esters of α,β-ethylenically unsaturated carboxylic acids; (meth)acrylic acid and derivatives thereof; maleic acid and derivatives thereof; itaconic acid and derivatives thereof; fumaric acid and derivatives thereof; vinyl acetate, vinyl alcohol, vinylpyrrolidone, acrylamide, and derivatives thereof; or the like. Examples of such copolymers include styrene-(meth)acrylic acid copolymers, styrene-(meth) acrylic acid-(meth)acrylic acid ester copolymers, (meth) acrylic acid ester-(meth)acrylic acid copolymers, polyethylene glycol (meth)acrylate-(meth)acrylic acid copolymers, styrene-maleic acid copolymers, etc. Of these, styrene-(meth)acrylic acid copolymers, styrene-(meth)acrylic acid-(meth)acrylic acid ester copolymers, and (meth)acrylic acid ester-(meth)acrylic acid copolymers are preferred, (meth) acrylic acid ester-(meth)acrylic acid copolymer is more preferred, and methacrylate ester-methacrylic acid copolymers are still more preferred. Examples of the type of the copolymer include a block copolymer, a random copolymer, and a graft copolymer, etc. These copolymers may be in the form of a salt.

The dispersing agent may be available as a commercial product or may be synthesized.

Examples of the dispersing agent available as a commercial product include: Joncyrl 62, 67, 68, 678, and 687 (styrene-acrylic copolymer from BASF); Mowinyl S-100A (modified vinyl acetate copolymer from Japan Coating Resin Co., Ltd.); JURYMER AT-210 (polyacrylic acid ester copolymer from Toagosei Chemical Industry Co., Ltd.); and the like.

Examples of the synthetically obtained dispersing agent include an A-B block polymer disclosed in PCT International Publication No. WO2013/115071. The monomer(s) constituting the A block of the A-B block polymer disclosed in PCT International Publication No. WO2013/115071 is at least one monomer selected from (meth)acrylic acid, or linear or branched C4-alkyl (meth)acrylate, preferably at least one monomer selected from methacrylic acid or n-butyl methacrylate, and more preferably a combination of these two monomers. In addition, the monomer(s) constituting the B block of the A-B block polymer disclosed in PCT International Publication No. WO2013/115071 is at least one monomer selected from benzyl methacrylate or benzyl acrylate, and preferably benzyl methacrylate. Specific examples of the A-B block polymer include block copolymers disclosed in Synthesis Examples 3 to 8 of PCT International Publication No. WO2013/115071.

The dispersing agent has an acid value of usually 90 to 200 mgKOH/g, preferably 100 to 150 mgKOH/g, and more preferably 100 to 120 mgKOH/g.

A neutralizer may be used for the purpose of uniformly dispersing the dispersing agent in water. Examples of the neutralizer include ammonia, hydroxides of alkali metals, hydroxides of alkaline earth metals, aliphatic amine compounds, alkanolamine compounds, etc. Of these, ammonia and hydroxides of alkali metals are preferred, and ammonia is more preferred. An exemplary amount of the neutralizer used is such an amount as to achieve a degree of neutralization of usually 30 to 300%, and preferably 50 to 200%, in which a degree of neutralization of 100% corresponds to the neutralization using the theoretical equivalent of the neutralizer to the acid value of the dispersing agent.

The dispersing agent has a mass-average molecular weight of usually 10,000 to 60,000, preferably 10,000 to 40,000, more preferably 15,000 to 30,000, and still more preferably 20,000 to 25,000. The mass-average molecular weight of the dispersing agent can be determined by gel permeation chromatography (GPC method). Specifically, the mass-average molecular weight of the dispersing agent can be determined using HLC-8320GPC (from Tosoh Corporation) as a GPC instrument, two TSK gel Super MultIpore HZ-H (from Tosoh Corporation; inner diameter 4.6 mm×15 cm) as columns, tetrahydrofuran as an eluent, and TSK Standard (from Tosoh Corporation) as a standard.

The dispersing agent preferably has a PDI (mass-average molecular weight/number average molecular weight) of about 1.29 to 1.49. The range as mentioned above tends to lead to favorable dispersibility and storage stability of the first ink composition.

The dispersing agent may be used in mixture with the first colorant. Further, the dispersing agent may be used with the first colorant, with a part or the entirety of the surface of the first colorant covered with the dispersing agent. Alternatively, both of these modes may be combined.

The ratio of the total mass of the dispersing agent to the total mass of the first colorant is usually 0.01 to 1.0, preferably 0.05 to 0.6, and more preferably 0.1 to 0.5.

[First Surfactant]

It is important that ink compositions have sufficient wettability on non- or less ink-absorbent media, and a surfactant is commonly used to impart the wettability to the ink compositions. Various surfactants to impart the wettability are widely known for the respective applications, including silicone-based, fluorine-based, acetylene-based surfactants, and the like. Among these, a silicone-based surfactant has an excellent ability to impart the wettability. However, the studies by the present inventors have revealed that printing with ink compositions having different storage periods in combination may result in severe intercolor bleeding despite no drastic change in storage stability (various physical properties such as ejectability, mean particle size, viscosity, and pH) of each ink composition, depending on the structure of the silicone-based surfactant. Silicone-based surfactants are generally known to decompose over time during long-term storage (see, for example, Kouji Sakuta, SHIKIZAI, 2001, vol. 74, No. 1, pp. 34-38). This leads to the presumption that silicone-based surfactants having a specific structure lose their ability to regulate the intercolor bleeding due to the collapse of their structures.

The present inventors have investigated the relationship between the structures of the silicone-based surfactants and the change in intercolor bleeding over time, and consequently have found that the use of a silicone-based surfactant represented by the following formula (1) hardly causes the intercolor bleeding regardless of two ink compositions having the same or different storage periods. Although the reasons for the suppression of the change of the intercolor bleeding over time are not clear, it is presumed that for the silicone-based surfactant represented by the formula (1), the majority of the structural part including the hydrophobic moiety of the siloxane structure (—Si—O—) and the hydrophilic moieties constituted by the ethyleneoxy group and the propyleneoxy group will be maintained even upon any collapse of the structure over time, and thus its function as the surfactant will be not lost.

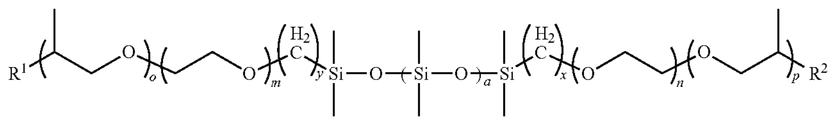

(1)

In the formula (1), $R^1$ and $R^2$ each independently represent a hydrogen atom, a hydroxy group, an alkyl group having 1 to 6 carbon atoms, or an alkoxy group having 1 to 3 carbon atoms, preferably a hydroxy group.

In the formula (1), a is an integer of 1 to 80, preferably 2 to 40, and more preferably 5 to 34. x and y are each independently an integer of 1 to 4, and preferably an integer of 1 to 3. m and n are each independently an integer of 1 to 50, preferably an integer of 1 to 40, more preferably an integer of 1 to 30, still more preferably an integer of 4 to 20, and particularly preferably an integer of 5 to 12. o and p are each independently an integer of 0 to 40, preferably an integer of 0 to 20, more preferably an integer of 0 to 10, and still more preferably an integer of 0 to 5. The sum of m and n is 2 to 100, preferably 4 to 80, more preferably 8 to 40, and still more preferably 10 to 25. The sum of o and p is 0 to 80, preferably 0 to 40, more preferably 0 to 20, and still more preferably 0 to 10.

The silicone-based surfactant represented by the formula (1) may be available as a commercial product or may be synthesized.

Examples of commercial products of the silicone-based surfactant represented by the formula (1) include: Silwet CoatOSil 2812, Silwet CoatOSil 2816, Silwet CoatOSil 3500, and Silwet CoatOSil 3505 from Momentive Performance Materials Inc.; BYK-331, BYK-333, BYK-UV3500, as well as BYK-new product 1 general grade and BYK-new product 2 reduced cyclic siloxane grade described in the document published on Jun. 22, 2020 (URL: www.byk.com/ja/company-news/media/news/detail/japanese-news-20200622-new-silicone-surface-modifier-for-aqueous-systems), from BYK-Chemie GmbH; Tego Glide 410, Tego Glide 432, Tego Glide 435, Tego Glide 440, and Tego Glide 450 from Evonik Degussa GmbH; Silface SWP-001, Silface SAG003, and Silface SAG005 from Nissin Chemical Co., Ltd.; and the like.

The silicone-based surfactant represented by the formula (1) can also be synthesized through the hydrosilylation reaction using, for example, polyethylene glycol having an allyl group at one end and polydimethylsiloxane having a reactive hydrogen atom at both ends as starting materials, and a platinum catalyst.

The content of the silicone-based surfactant represented by the formula (1) is usually 0.01 to 3% by mass, preferably 0.05 to 2% by mass, more preferably 0.1 to 1% by mass, based on the total mass of the first ink composition.

[First Hydrophobic Organic Solvent]

The first hydrophobic organic solvent has a water-octanol partition coefficient of 2.00 or more and less than 3.50, and preferably 2.40 to 3.00. This range of the water-octanol partition coefficient allows for a further improvement of the suppressive effect on the intercolor bleeding, which effect may be insufficient with the silicone-based surfactant alone. In this specification, "water-octanol partition coefficient" means a C log P value calculated using ChemDraw Professional ver. 16.0 from Perkin Elmer. The values calculated thus do not have a constant number of decimal places. Therefore, in this specification, the third decimal place is rounded off to the second decimal place. In addition, when the calculated value has up to the second decimal place, the value is described as such. Further, when the calculated value does not have two decimal places, each digit up to the second decimal place is considered "zero", and in each case, up to the second decimal place is described. Hereinbelow, the "water-octanol partition coefficient" may be referred to as "C log P value".

Examples of the organic solvent having a C log P value of 2.00 or more and less than 3.50 include 1,2-nonanediol (2.11), 2-propylheptane-1,3-diol (2.31), ethylene glycol monoheptyl ether (2.43), ethylene glycol diisobutyl ether (2.55), dibutyl diglycol (2.63), 1,2-decanediol (2.64), 2-[2-(2-ethylhexyloxy)ethoxy]ethanol (2.65), diisobutyl ketone (2.71), 2,2,4-trimethyl-1,3-pentanediol monoisobutyrate (2.74), 2-ethyl-1-hexanol (2.81), ethylene glycol dibutyl ether (2.81), 2,6-dimethyl-4-heptanol (2.99), 3,5,5-trimethyl-1-hexanol (3.08), 2-butoxyethyl benzoate (3.43), diethylene glycol monobutyl ether adipate (3.49), etc. Incidentally, the numerical values in parentheses are C log P values.

The content of the first hydrophobic organic solvent is usually 0.01 to 2% by mass, preferably 0.05 to 1.5% by mass, and more preferably 0.1 to 1% by mass, based on the total mass of the first ink composition.

[Water]

The first ink composition contains the components described above, and optionally an ink modifying agent, and the remainder thereof is water. The water is preferably water with less impurities (e.g., metal ions), such as ion-exchanged water and distilled water.

[Ink Modifying Agent]

The first ink composition may further contain an ink modifying agent, in addition to the components described above. Examples of the ink modifying agent include a binder, a penetrant, a viscosity modifier, a surfactant other than the silicone-based surfactant, a preservative, a fungicide, a pH adjuster, a chelating agent, an antirust agent, a water-soluble UV absorber, an antioxidant, etc.

The content of the total ink modifying agent except for the binder, the penetrant, and the viscosity modifier is usually 0 to 30% by mass, preferably 0.1 to 20% by mass, and more preferably 0.5 to 10% by mass, based on the total mass of the first ink composition.

(Binder)

The binder is preferably at least one selected from a wax or a (meth)acrylic polymer. The ink composition containing the binder can exhibit improved scratch resistance of printed images. The binder is preferably added as an emulsion, and more preferably as an aqueous emulsion.

Natural waxes and synthetic waxes may be used as the wax. Examples of the natural waxes include emulsions prepared by dispersing, in an aqueous medium, one or more waxes including: petroleum-based waxes such as paraffin waxes and microcrystalline waxes; brown coal-based waxes such as montan wax; plant-based waxes such as carnauba waxes and candelilla waxes; fauna and flora-based waxes such as beeswaxes and lanolins; and the like. Examples of the synthetic wax include polyalkylene waxes (preferably, poly-C2-C4-alkylene waxes), oxidized polyalkylene waxes (preferably, oxidized poly-C2-C4-alkylene waxes), paraffin waxes, etc. Of these, at least one selected from a polyethylene wax, a polypropylene wax, an oxidized polyethylene wax, an oxidized polypropylene wax, or paraffin waxes is preferred, and an oxidized polyethylene wax is more preferred.

Examples of commercial products of a wax emulsion include CERAFLOUR 925, 929, 950, 991, AQUACER 498, 515, 526, 531, 537, 539, 552, 1547, and AQUAMAT 208, 263, 272 from BYK-Chemie GmbH; MINERPOL 221, etc. from BYK-Chemie GmbH; Mitsui Hi-Wax NL100, NL200, NL500, 4202E, 1105A, 2203A, NP550, NP055, NP505, etc. from Mitsui Chemicals, Inc.; KUE-100, 11 from Sanyo Chemical Industries, Ltd.; and the like. Of these, AQUACER 515, 531, 537, 539, and 1547 are preferred, and AQUACER 515, 531, 537, and 1547 are more preferred.

The (meth)acrylic polymer as the binder differs from the dispersing agent described above. The (meth)acrylic polymer is preferably composed of four types of monomers of C1-C4-alkyl methacrylate, C6-C10-alkyl acrylate, methacrylic acid, and allyl methacrylate.

The alkyl moiety of the C1-C4-alkyl methacrylate may be linear or branched, and is preferably linear. The C1-C4-alkyl methacrylate is preferably C1-C3-alkyl methacrylate, more preferably C1-C2-alkyl methacrylate, and still more preferably methyl methacrylate.

The alkyl moiety of the C6-C10-alkyl acrylate may be linear or branched, and is preferably branched. The C6-C10-alkyl acrylate is preferably C7-C9-alkyl acrylate, more preferably C8-alkyl acrylate, and still more preferably 2-ethylhexyl acrylate.

The ratio of the four types of monomers of C1-C4-alkyl methacrylate, C6-C10-alkyl acrylate, methacrylic acid, and allyl methacrylate in the (meth)acrylic polymer is usually 40 to 60% by mass, 38 to 58% by mass, 1 to 10% by mass, and 1 to 5% by mass, respectively, and preferably 45 to 55% by mass, 52 to 42% by mass, 2 to 4% by mass, and 1 to 3% by mass, respectively, and the sum of the respective ratios within the respective ranges is preferably 100% by mass.

The (meth)acrylic polymer has an acid value of usually −10 to 35 mgKOH/g, preferably −5 to 30 mgKOH/g, and more preferably 0 to 25 mgKOH/g.

The (meth)acrylic polymer has a glass transition temperature (Tg) of usually −20 to 30° C., preferably −15 to 25° C., and more preferably −10 to 20° C.

The average particle size of the binder is preferably 50 nm to 5 μm, and more preferably 100 nm to 1 μm in order to prevent clogging of an inkjet head.

When the first ink composition contains the binder, the content thereof (the content in terms of solid matter) is usually 0.1 to 14% by mass, preferably 0.5 to 12% by mass, more preferably 2 to 10% by mass, and still more preferably 3 to 8% by mass, based on the total mass of the first ink composition.

(Penetrant)

The penetrant is preferably an organic solvent selected from glycol ether and C4-C9-alkanediol, and having a C log P value of 0.00 or more and less than 2.00. The ink composition containing the penetrant tends to exhibit favorable wetting and spreading of the ink on the non- or less ink-absorbent media, and favorable drying properties of the ink.

Examples of the penetrant having a C log P value of 0.00 or more and less than 2.00 include 1,2-pentanediol (0.00), ethylene glycol monoallyl ether (0.03), isopropyl alcohol (0.07), isopropyl glycol (0.09), diethylene glycol ethyl methyl ether (0.13), dipropylene glycol dimethyl ether (0.36), 3-methoxy-3-methyl-1-butanol (0.42), butyl triglycol (0.49), diethylene glycol diethyl ether (0.52), 1,2-hexanediol (0.53), diethylene glycol monoisobutyl ether (0.54), propyl propylene glycol (0.62), butyl diglycol (0.67), dipropylene glycol n-propyl ether (0.75), 2,2-diethyl-1,3-propanediol (0.82), 2,2,4-trimethyl-1,3-pentanediol (1.00), 2-ethyl-1,3-hexanediol (1.26), 1,2-octanediol (1.58), hexyl diglycol (1.72), etc. Incidentally, the numerical values in parentheses are C log P values.

When the first ink composition contains the penetrant, the content thereof is usually 0.1 to 30% by mass, preferably 0.2 to 20% by mass, more preferably 0.5 to 10% by mass, still more preferably 2 to 8% by mass, and particularly preferably 4 to 6% by mass, based on the total mass of the first ink composition.

(Viscosity Modifier)

The first ink composition may further contain the viscosity modifier. Industrial inkjet printers usually have the predetermined range of the viscosity of ejectable ink compositions based on specifications of a printer head (ink-ejecting head) mounted thereon. Thus, the viscosity modifier may be added to the first ink composition to adjust its viscosity to an appropriate range.

The viscosity modifier may be any substance which can adjust the viscosity of the ink composition, and known substances which function as such may be used. Specific examples of the viscosity modifier include water-soluble organic solvents (except for the organic solvents listed above as the penetrant), saccharides, etc. Of these, water-soluble organic solvents having a C log P value of usually less than 0.00, preferably −0.05 or less, and more preferably −0.08 or less are preferred. The lower limit of the C log P value of the water-soluble organic solvents is not particularly limited, and usually −4.00 or more, preferably −3.00 or more, more preferably −2.00 or more, and still more preferably −1.50 or more.

Examples of the water-soluble organic solvents having a C log P value of less than 0.00 include 2-methyl-2,4-pentanediol (−0.02), tripropylene glycol monomethyl ether (−0.03), isopropyl diglycol (−0.08), dipropylene glycol monomethyl ether (−0.16), ethanol (−0.24), 3-methyl-1,5-pentanediol (−0.24), diethylene glycol dimethyl ether (−0.26), propylene glycol monomethyl ether (−0.30), 3-methyl-1,3-butanediol (−0.33), trimethylolpropane (−0.39), N-methyl-2-pyrrolidone (−0.40), 1,2-butanediol (−0.53), 3-ethyl-3-hydroxymethyloxetane (−0.58), 1,5-pentanediol (−0.64), 2-methyl-1,3-propanediol (−0.64), dipropylene glycol (−0.69), 1,3-butanediol (−0.73), methyl diglycol (−0.78), methyl triglycol (−0.96), 2-pyrrolidone (−0.97), propylene glycol (−1.06), 1,4-butanediol (−1.16), diethylene glycol (−1.30), ethylene glycol (−1.37), triethylene glycol (−1.48), glycerin (−1.54), diglycerin (−2.96), as well as GLYCERETH-3 (−3.49) and GLYCERETH-20 (−5.42) from Aoki Oil Industrial Co., Ltd., etc. Incidentally, the numerical values in parentheses are C log P values.

The content of the viscosity modifier is usually 0 to 55% by mass, preferably 5 to 40% by mass, more preferably 10 to 30% by mass, based on the total mass of the first ink composition.

(Surfactant Other than Silicone-Based Surfactant)

The surfactant of this category is exemplified by an anionic surfactant, a cationic surfactant, an amphoteric surfactant, and a fluorine-based surfactant.

Examples of the anionic surfactant include alkylsulfocarboxylic acid salts, α-olefinsulfonic acid salts, polyoxyethylene alkyl ether acetic acid salts, polyoxyethylene alkyl ether sulfuric acid salts, N-acylamino acids or salts thereof, salts of N-acyl-methyltaurine, alkyl sulfuric acid salts, polyoxyalkyl ether sulfuric acid salts, alkyl sulfuric acid salts, polyoxyethylene alkyl ether phosphoric acid salts, rosin acid soaps, salts of sulfates of castor oil, salts of sulfates of lauryl alcohol, alkylphenol-type phosphates, alkyl-type phosphates, alkylarylsulfonic acid salts, diethylsulfosuccinic acid salts, diethylhexylsulfosuccinic acid salts, dioctylsulfosuccinic acid salts, etc.

Examples of the cationic surfactant include 2-vinylpyridine derivatives, poly-4-vinylpyridine derivatives, etc.

Examples of the amphoteric surfactant include lauryldimethylaminoacetic acid betaine, 2-alkyl-N-carboxymethyl-N-hydroxyethylimidazolinium betaine, palm oil fatty acid amide propyldimethylaminoacetic acid betaine, polyoctylpolyaminoethylglycine, imidazoline derivatives. etc.

Examples of the fluorine-based surfactant include perfluoroalkylsulfonic acid compounds, perfluoroalkylcarboxylic acid-based compounds, perfluoroalkyl phosphate compounds, perfluoroalkyl ethylene oxide adducts, polyoxyalkylene ether polymer compounds having a perfluoroalkyl ether group in a side chain thereof, etc.

When the first ink composition contains the surfactant other than the silicone-based surfactant, the content thereof is usually 0.1 to 2.0% by mass, based on the total mass of the first ink composition.

(Preservative)

Examples of the preservative include organosulfur compounds, organic nitrogen-sulfur compounds, organic halogen compounds, haloaryl sulfone compounds, iodopropargyl compounds, haloalkylthio compounds, nitrile compounds, pyridine compounds, 8-oxyquinoline compounds, benzothiazole compounds, isothiazoline compounds, dithiol compounds, pyridine oxide compounds, nitropropane compounds, organic tin compounds, phenol compounds, quaternary ammonium salt compounds, triazine compounds, thiazine compounds, anilide compounds, adamantane compounds, dithiocarbamate compounds, brominated indanone compounds, benzyl bromoacetate compounds, and inorganic salt-based compounds. Specific examples of commercial products of the preservative include Proxel GXL(S), XL-2(S) from Lonza, etc.

(Fungicide)

Examples of the fungicide include sodium dehydroacetate, sodium benzoate, sodium pyridinethione-1-oxide, p-hydroxybenzoic acid ethyl ester, and 1,2-benzoisothiazolin-3-one, and salts thereof, etc.

(PH Adjuster)

Any substance which can adjust the pH of the ink composition to be prepared to 5 to 11 without adversely affecting the ink composition may be used as the pH adjuster. Specific examples of such a substance include: alkanolamines such as diethanolamine, triethanolamine, and N-methyldiethanolamine; hydroxides of alkali metals such as lithium hydroxide, sodium hydroxide, and potassium hydroxide; ammonium hydroxide (aqueous ammonia); carbonates of alkali metals such as lithium carbonate, sodium carbonate, sodium hydrogen carbonate, and potassium carbonate; alkali metal salts of organic acids such as sodium silicate and potassium acetate; inorganic bases such as disodium phosphate; and the like.

(Chelating Agent)

Examples of the chelating agent include ethylenediaminetetraacetic acid disodium salt, nitriloacetic acid sodium salts, hydroxyethylethylenediaminetriacetic acid sodium salts, diethylenetriaminepentaacetic acid sodium salts, uracil diacetic acid sodium salts, etc.

(Antirust Agent)

Examples of the antirust agent include acidic sulfite, sodium thiosulfate, thioglycolic acid ammonium salt, diisopropylammonium nitrite, pentaerythritol tetranitrate, dicyclohexylammonium nitrite, etc.

(Water-Soluble UV Absorber)

Examples of the water-soluble UV absorber include sulfonated benzophenone compounds, benzotriazole compounds, salicylic acid compounds, cinnamic acid compounds, triazine compounds, etc.

(Antioxidant)

Various organic and metal-complex-based anti-fading agents may be used as the antioxidant. Examples of the organic anti-fading agent include hydroquinones, alkoxyphenols, dialkoxyphenols, phenols, anilines, amines, indanes, chromanes, alkoxyanilines, heterocycles, etc.

[Preparation Method of Ink Composition, etc.]

The first ink composition is preferably prepared by preparing a dispersion containing the first colorant and the dispersing agent, and then mixing the dispersion with other components.

Examples of the preparation method of the dispersion include phase inversion emulsification, acidification, interfacial polymerization, in-situ polymerization, in-liquid curing coating, coacervation (phase separation), in-liquid drying, melting-dispersion-cooling, in-air suspension coating, spray drying, etc. Of these, phase inversion emulsification, acidification, and interfacial polymerization are preferred, and phase inversion emulsification is more preferred.

In the case where a dispersion is prepared by phase inversion emulsification, for example, a dispersing agent is dissolved in an organic solvent such as 2-butanone and an aqueous solution of a neutralizer is added thereto to prepare an emulsified solution. A first colorant is added to the resulting emulsified solution, and then the mixture is subjected to a dispersion treatment. An organic solvent and a part of water is evaporated from the liquid obtained thus under reduced pressure to obtain a target dispersion.

The dispersion treatment may be performed using a sand mill (bead mill), a roll mill, a ball mill, a paint shaker, an ultrasound disperser, a microfluidizer, or the like. For example, when a sand mill is used, the dispersion treatment may be performed by using beads having a particle diameter of about 0.01 to 1 mm, and appropriately setting a filling rate of the beads. The particle diameter of the particles contained in the dispersion can be made uniform by subjecting the dispersion obtained as described above to an operation such as filtration or centrifugation. In the case where foaming takes place during the preparation of the dispersion, a very small amount of known defoamer such as a silicone-based defoamer or acetylene glycol-based defoamer may be added.

The average particle size (D50) of the first colorant in the dispersion is usually 300 nm or less, preferably 30 to 280 nm, more preferably 40 to 270 nm, and still more preferably 50 to 250 nm. Additionally, D90 is usually 400 nm or less, preferably 350 nm or less, and more preferably 300 nm or less. The lower limit of D90 is preferably 100 nm. D10 is usually 10 nm or more, preferably 20 nm or more, and more preferably 30 nm or more. The upper limit of D10 is preferably 100 nm. The aforementioned range of the particle size of the first colorant in the dispersion tends to enable stable ejection of the ink without clogging of an inkjet head nozzle while maintaining the storage stability of the ink composition. In this regard, the average particle size (D50) is a particle size where the cumulative particle size distribution starting from the smaller particle size side in the size distribution determined by the laser diffraction/scattering reaches 50%, D90 is a particle size where the cumulative particle size distribution starting from the smaller particle size side reached 90%, and D10 denotes a particle size where the cumulative particle size distribution starting from the smaller particle size side reaches 10%.

The first ink composition has a pH of usually 7 to 11, and preferably 8 to 10 at 25° C. The first ink composition has a surface tension of usually 10 to 50 mN/m, and preferably 20 to 40 mN/m at 25° C. The first ink composition has a viscosity of usually 2 to 30 mPa·s, and preferably 3 to 20 mPa·s at 25° C. The pH, surface tension, and viscosity of the first ink composition can be adjusted using the pH adjuster, the surfactant, the viscosity modifier, and others.

The first ink composition can be used in various types of printing. For example, the first ink composition is suitable for writing tools, various types of printing, information printing, textile printing, etc., and is preferably used for inkjet printing.

Second Ink Composition

The second ink composition contains the second colorant, the second surfactant, the second hydrophobic organic solvent, and water, and may further contain other components. Examples of other components include a dispersing agent and an ink modifying agent.

The second colorant, the second surfactant, the second hydrophobic organic solvent, and other components may be similar to the colorant, surfactant, hydrophobic organic solvent, and other components, respectively, which are described for the first ink composition. In addition, the content of each component may also fall within the preferred range described for each component of the first ink composition.

The second colorant is preferably different in color from the first colorant. This is because intercolor bleeding is likely to be observed when the first and second colorants are different from each other so as to be visually distinguishable. Preferably, the first and second colorants each have one color selected from the group consisting of cyan, magenta, yellow, black, green, orange, red, and violet, and their colors are different from each other.

The contents of the first surfactant and the first hydrophobic organic solvent in the first ink composition, and the contents of the second surfactant and the second hydrophobic organic solvent in the second ink composition are required to satisfy a specific relationship. More specifically, when the content of the first surfactant in the first ink composition is designated as A1 (% by mass), the content of the first hydrophobic organic solvent in the first ink composition is designated as A2 (% by mass), the content of the second surfactant in the second ink composition is designated as B1 (% by mass), and the content of the second hydrophobic organic solvent in the second ink composition is designated as B2 (% by mass), the condition expressed by the following inequation (2) should be satisfied:

$$0.05 \leq [0.5\times(B1-A1)+(B2-A2)] \leq 0.70 \quad (2)$$

The value of [0.5×(B1−A1)+(B2−A2)] is preferably in the range of 0.10 to 0.65, and more preferably 0.20 to 0.60.

In the inequation (2), the coefficient is determined according to the degree of impact on the intercolor bleeding. Specifically, since the hydrophobic organic solvents having low molecular weights have greater contribution to the intercolor bleeding than the surfactants, the difference in the surfactant contents (B1−A1) is multiplied by a coefficient of 0.5. When the condition of the inequation (2) is satisfied, the intercolor bleeding can be suppressed and favorable quality of printed images can be achieved. It has been observed that a value of [0.5×(B1−A1)+(B2−A2)] out of the aforementioned range leads to loss of the hydrophilicity-hydrophobicity balance at ink interfaces of the first ink composition and the second ink composition, and hence to more severe intercolor bleeding. For example, it has been observed that a value of [0.5×(B1−A1)+(B2−A2)] of less than 0.05 results in the occurrence of bleeding of the first ink composition into the second ink composition, whereas a value of [0.5×(B1−A1)+(B2−A2)] of greater than 0.70 results in the occurrence of bleeding of the second ink composition into the first ink composition.

It should be noted that the phenomenon of the suppression of the intercolor bleeding when the condition expressed by the inequation (2) is satisfied, is observed only in the case where the silicone-based surfactant represented by the formula (1) is used in the first and second ink compositions. Although the reasons for this phenomenon are not clear, it is presumed that in continued printing using two inks of different colors, an imbalance in the ink interfacial tension between the two color inks causes the bleeding of one color ink into the other. Since the surfactant and the hydrophobic organic solvent are oriented at the ink interface, they are considered to have a great impact. On the other hand, ink ejecting in inkjet printing is caused by the vibration of a piezoelectric element of an inkjet head, and thus the ink droplets are considered to be affected as well by the vibration caused by the driving of the inkjet head, etc. until immediately after the landing. Therefore, it is considered that immediately after the ink landing, the hydrophobic organic solvent having a lower molecular weight, which is more likely to be oriented at the interface, is oriented first, and the surfactant is then oriented at the interface, and this difference in timing of the orientation is presumed to contribute to the suppression of the intercolor bleeding. Further, in comparison to general surfactants with hydrophilic and hydrophobic groups separated at both ends, the silicone-based surfactant represented by the formula (1) has a characteristic structure, i.e., hydrophilic groups at both ends, and the silicone-based surfactant is presumed to have delayed orientation at the ink interface. Because of the delayed orientation, the silicone-based surfactant is presumed to have less impact on the ink interface immediately after the ink landing. The inequation (2) employs the coefficient suitable for the silicone-based surfactant represented by the formula (1), and thus it is presumed that another type of surfactant does not satisfy the aforementioned relational expression.

The ink set according to the present embodiment can achieve printed images with minimal intercolor bleeding regardless of the storage period of each ink composition therein. Additionally, the ink set according to the present embodiment exhibits favorable wetting and spreading on non- or less ink-absorbent media, and yields printed images with minimal graininess. The ink set according to the present embodiment is extremely useful for various types of printing, in particular, inkjet printing.

Ink and Medium Set

The ink and medium set according to the present embodiment includes the aforementioned ink set according to the present embodiment, and a printing medium.

Examples of the printing medium include paper, film, fiber and cloth (cellulose, nylon, wool, etc.), leather, color filter substrates, etc. These printing media may be generally classified into those having an ink absorbing layer and those having no ink absorbing layer. The ink set according to the present embodiment can be applied to any printing medium, and suitably used for printing media having no ink absorbing layer.

Printing media having an ink absorbing layer are usually referred to as inkjet paper, inkjet film, glossy paper, or the like. Examples of representative commercial products of the printing media having an ink absorbing layer include: Professional Photo Paper, Super Photo Paper, Glossy Gold, and Matte Photo Paper from Canon Inc.; photo paper CRISPIA (high gloss), photo paper (gloss), and Photo Matte Paper from Seiko Epson Corporation; Advanced Photo paper (glossy) from Hewlett-Packard Japan, Ltd.; Kassai Photo Finish Pro from FUJIFILM Corporation; and the like.

Examples of the printing medium having no ink absorbing layer include: various types of paper such as coated paper, which is used for gravure printing, offset lithography, etc., and art paper; cast coated paper, which is used for label printing; and the like. When the printing medium having no ink absorbing layer is used, the printing medium is also preferably subjected to a surface modification treatment for the purpose of improving the fixability of the colorant, etc. Examples of the surface modification treatment include known techniques such as corona discharge treatment, plasma treatment, and frame treatment.

Inkjet Printing Method and Printed Medium

The inkjet printing method according to the present embodiment uses the aforementioned ink set according to the present embodiment, and includes: ejecting droplets of the first ink composition, and attaching the droplets to a printing medium to form a first image; and ejecting droplets of the second ink composition, and attaching the droplets to the printing medium having the first image formed thereon to form a second image. The forming of the first image and the forming of the second image are performed using an inkjet technique.

Further, the printed medium according to the present embodiment includes a first image formed by applying the first ink composition, and a second image formed by applying second ink composition on the first image.

Any known inkjet technique may be employed as the aforementioned inkjet technique. Specific examples of the inkjet technique include a charge controlling technique, a drop-on-demand (pressure pulse) technique, an acoustic inkjet technique, a thermal inkjet technique, etc. Additionally, the inkjet technique also includes a technique that involves ejecting a large number of small-volume droplets of an ink composition having a lower content of the colorant to improve an image quality; a technique that involves using a plurality of ink compositions having substantially the same hue and different contents of the colorant to improve an image quality; a technique that involves using a clear and colorless ink to improve the fixability of the colorant; and the like.

In printing on the printing medium, a container (ink tank) containing an ink is loaded at a predetermined position in an inkjet printer, and printing is performed on the printing medium according to the aforementioned printing method, by way of example. Incidentally, full color printing can also be achieved by loading a container containing inks of the respective colors at a predetermined position in an inkjet printer, and performing printing on the printing medium according to the aforementioned printing method.

With respect to all the disclosure described above, combinations of preferred features are more preferred, and combinations of more preferred features are still more preferred. The same applies to combinations of a preferred feature and a more preferred feature, combinations of a more preferred feature and still more preferred feature, and the like.

EXAMPLES

Hereinafter, the present invention will be described in more detail with reference to Examples, but the present invention is not limited by the following Examples.

In Examples, "parts" means parts by mass, and "%" means % by mass, unless otherwise specified. In Examples, in the case where the quantitative determination of the solid content of a colorant in a dispersion is required, the solid content was calculated in terms of only a colorant according to a dry weight method using MS-70 from A&D Company, Limited.

Preparation Example 1: Preparation of Colorant Dispersion Dp1

Synthesis Example 3 in PCT International Publication No. WO2013/115071 was replicated to obtain a block copolymer (block copolymer A). The block copolymer obtained thus had an acid value of 105 mgKOH/g, and a mass-average molecular weight of 25,000. The obtained block copolymer (4.8 parts) was dissolved in 20 parts of 2-butanone to form a uniform solution. To this solution was added a solution prepared by dissolving sodium hydroxide (0.35 parts) in water (58.8 parts), and the mixture was stirred for 1 hour to form an emulsified solution. To this emulsified solution was added C.I. Pigment Blue 15:4 (hereinafter, referred to as "PB15:4") (16 parts), and the mixture was subjected to a dispersion treatment in a sand grinder under a condition of 1,500 rpm for 15 hours to form a solution. Water (100 parts) was added dropwise to the resulting solution, and this solution was filtered to obtain a filtrate. 2-Butanone and a part of water were evaporated from the resulting filtrate on an evaporator under reduced pressure to obtain a cyan dispersion having a content of the colorant of 12.0%. The dispersion obtained thus was designated as "Dp1".

Preparation Example 2: Preparation of Colorant Dispersion Dp2

A yellow dispersion having a content of the colorant of 12.0% was obtained in the same manner as Preparation Example 1 except that C.I. Pigment Yellow 74 (hereinafter, referred to as "PY74") was used in place of PB15:4. The resulting dispersion was designated as "Dp2".

Synthesis Example 1: Synthesis of Silicone-Based Surfactant B

Hexadecamethyloctasiloxane (5.8 g) and chloroplatinic acid (0.1 mL) were added to a tetrahydrofuran solution (20 mL) containing hexaethylene glycol allyl methyl ether (7.0 g), and the mixture was kept at 65° C. for 24 hours with stirring for the reaction to occur. After completion of the reaction, the solvent was evaporated on an evaporator under reduced pressure to obtain a silicone-based surfactant B. The silicone-based surfactant B obtained thus is represented by the above formula (1), in which $R^1$ and $R^2$ each represent a hydroxy group, a=6, x=2, y=2, m=7, n=7, o=0, and p=0.

Preparation of Ink Compositions C1 to C18 and Y1 to Y20

The dispersions Dp1 and Dp2 were mixed with the components specified in Tables 1 to 4 below, and then the mixture was filtered through a membrane filter with a pore diameter of 3 μm (mixed cellulose esters membrane filter from Advantec Toyo Kaisha, Ltd.) to obtain ink compositions C1 to C18 and Y1 to Y20 for evaluation tests. The content of the colorant in each ink composition based on the total mass thereof was adjusted to 4.5%. The ink compositions C1 to C18 shown in Tables 1 and 2 were all cyan inks. On the other hand, the ink compositions Y1 to Y20 shown in Tables 3 and 4 were all yellow inks. Numerical values in Tables 1 to 4 represent the number of parts of each component.

TABLE 1

| Component | C1 | C2 | C3 | C4 | C5 | C6 | C7 | C8 | C9 |
|---|---|---|---|---|---|---|---|---|---|
| Dp1 | 37.5 | 37.5 | 37.5 | 37.5 | 37.5 | 37.5 | 37.5 | 37.5 | 37.5 |
| PG | 27.0 | 27.0 | 27.0 | 27.0 | 27.0 | 27.0 | 27.0 | 27.0 | 27.0 |
| 1,2-HD | 6.0 | 6.0 | 6.0 | 6.0 | 6.0 | 6.0 | 6.0 | 6.0 | 6.0 |
| TEA | 0.5 | 0.5 | 0.5 | 0.5 | 0.5 | 0.5 | 0.5 | 0.5 | 0.5 |
| TG450 | 0.5 | 0.5 | 0.5 | 1.0 | 1.0 | | 0.5 | | |
| SAG005 | | | | | | | | 0.5 | |
| Surfactant A | | | | | | | | | 0.5 |
| Surfactant B | | | | | | | | | |
| BYK349 | | | | | | | | | |
| TW270 | | | | | | | | | |
| CS-12 | 0.8 | 1.0 | 1.4 | 0.8 | 1.4 | 0.8 | 0.0 | 0.8 | 0.8 |
| DBDG | | | | | | | | | |
| 1,2-ND | | | | | | | | | |
| EGmHE | | | | | | | | | |
| CS-16 | | | | | | | | | |
| 1,2-DD | | | | | | | | | |
| Aquacer 515 | 5.7 | 5.7 | 5.7 | 5.7 | 5.7 | 5.7 | 5.7 | 5.7 | 5.7 |
| Water | 22.0 | 21.8 | 21.4 | 21.5 | 20.9 | 22.5 | 22.8 | 22.0 | 22.0 |
| Total | 100.0 | 100.0 | 100.0 | 100.0 | 100.0 | 100.0 | 100.0 | 100.0 | 100.0 |

TABLE 2

| Component | C10 | C11 | C12 | C13 | C14 | C15 | C16 | C17 | C18 |
|---|---|---|---|---|---|---|---|---|---|
| Dp1 | 37.5 | 37.5 | 37.5 | 37.5 | 37.5 | 37.5 | 37.5 | 37.5 | 37.5 |
| PG | 27.0 | 27.0 | 27.0 | 27.0 | 27.0 | 27.0 | 27.0 | 27.0 | 27.0 |
| 1,2-HD | 6.0 | 6.0 | 6.0 | 6.0 | 6.0 | 6.0 | 6.0 | 6.0 | 6.0 |
| TEA | 0.5 | 0.5 | 0.5 | 0.5 | 0.5 | 0.5 | 0.5 | 0.5 | 0.5 |
| TG450 | | | | 0.5 | 0.5 | 0.5 | 0.5 | 0.5 | 0.5 |
| SAG005 | | | | | | | | | |
| Surfactant A | | | | | | | | | |
| Surfactant B | 0.5 | | | | | | | | |
| BYK349 | | 0.5 | | | | | | | |
| TW270 | | | 0.5 | | | | | | |
| CS-12 | 0.8 | 0.8 | 0.8 | | | | | | |
| DBDG | | | | 0.8 | | | | | |
| 1,2-ND | | | | | 0.8 | | | | |
| EGmHE | | | | | | 0.8 | | 0.8 | |
| CS-16 | | | | | | | 0.8 | | |
| 1,2-DD | | | | | | | | | 0.8 |
| Aquacer 515 | 5.7 | 5.7 | 5.7 | 5.7 | 5.7 | 5.7 | 5.7 | 5.7 | 5.7 |
| Water | 22.0 | 22.0 | 22.0 | 22.0 | 22.0 | 22.0 | 22.0 | 22.0 | 22.0 |
| Total | 100.0 | 100.0 | 100.0 | 100.0 | 100.0 | 100.0 | 100.0 | 100.0 | 100.0 |

TABLE 3

| Component | Y1 | Y2 | Y3 | Y4 | Y5 | Y6 | Y7 | Y8 | Y9 | Y10 |
|---|---|---|---|---|---|---|---|---|---|---|
| Dp2 | 37.5 | 37.5 | 37.5 | 37.5 | 37.5 | 37.5 | 37.5 | 37.5 | 37.5 | 37.5 |
| PG | 27.0 | 27.0 | 27.0 | 27.0 | 27.0 | 27.0 | 27.0 | 27.0 | 27.0 | 27.0 |
| 1,2-HD | 6.0 | 6.0 | 6.0 | 6.0 | 6.0 | 6.0 | 6.0 | 6.0 | 6.0 | 6.0 |
| TEA | 0.5 | 0.5 | 0.5 | 0.5 | 0.5 | 0.5 | 0.5 | 0.5 | 0.5 | 0.5 |
| TG450 | 0.5 | 0.5 | 1.0 | 1.0 | 0.0 | 0.8 | | | | |
| SAG005 | | | | | | | 0.5 | | | |
| Surfactant A | | | | | | | | 0.5 | | |
| Surfactant B | | | | | | | | | 0.5 | |
| BYK349 | | | | | | | | | | 0.5 |
| TW270 | | | | | | | | | | |
| CS-12 | 0.8 | 1.4 | 0.8 | 1.4 | 1.4 | | 0.8 | 1.4 | 1.4 | 1.4 |
| DBDG | | | | | | | | | | |
| 1,2-ND | | | | | | | | | | |
| EGmHE | | | | | | | | | | |
| CS-16 | | | | | | | | | | |
| 1,2-DD | | | | | | | | | | |
| Aquacer 515 | 5.7 | 5.7 | 5.7 | 5.7 | 5.7 | 5.7 | 5.7 | 5.7 | 5.7 | 5.7 |
| Water | 22.0 | 21.4 | 21.5 | 20.9 | 21.9 | 22.5 | 22.0 | 21.4 | 21.4 | 21.4 |
| Total | 100.0 | 100.0 | 100.0 | 100.0 | 100.0 | 100.0 | 100.0 | 100.0 | 100.0 | 100.0 |

TABLE 4

| Component | Y11 | Y12 | Y13 | Y14 | Y15 | Y16 | Y17 | Y18 | Y19 | Y20 |
|---|---|---|---|---|---|---|---|---|---|---|
| Dp2 | 37.5 | 37.5 | 37.5 | 37.5 | 37.5 | 37.5 | 37.5 | 37.5 | 37.5 | 37.5 |
| PG | 27.0 | 27.0 | 27.0 | 27.0 | 27.0 | 27.0 | 27.0 | 27.0 | 27.0 | 27.0 |
| 1,2-HD | 6.0 | 6.0 | 6.0 | 6.0 | 6.0 | 6.0 | 6.0 | 6.0 | 6.0 | 6.0 |
| TEA | 0.5 | 0.5 | 0.5 | 0.5 | 0.5 | 0.5 | 0.5 | 0.5 | 0.5 | 0.5 |
| TG450 | | 0.5 | 0.5 | 0.5 | 0.5 | 0.5 | 0.5 | 0.5 | 0.5 | 0.5 |
| SAG005 | | | | | | | | | | |
| Surfactant A | | | | | | | | | | |
| Surfactant B | | | | | | | | | | |
| BYK349 | | | | | | | | | | |

TABLE 4-continued

| Component | Y11 | Y12 | Y13 | Y14 | Y15 | Y16 | Y17 | Y18 | Y19 | Y20 |
|---|---|---|---|---|---|---|---|---|---|---|
| TW270 | 0.5 | | | | | | | | | |
| CS-12 | 1.4 | | | | | 1.5 | 0.9 | | 1.55 | |
| DBDG | | 1.4 | | | | | | | | |
| 1,2-ND | | | 1.4 | | | | | | | |
| EGmHE | | | | 1.4 | | | | 1.4 | | |
| CS-16 | | | | | 1.4 | | | | | |
| 1,2-DD | | | | | | | | | | 1.4 |
| Aquacer 515 | 5.7 | 5.7 | 5.7 | 5.7 | 5.7 | | | | | |
| Water | 21.4 | 21.4 | 21.4 | 21.4 | 21.4 | 98.5 | 99.2 | 98.6 | 98.5 | 98.6 |
| Total | 100.0 | 100.0 | 100.0 | 100.0 | 100.0 | 100.0 | 100.0 | 100.0 | 100.0 | 100.0 |

The details of the components in Tables 1 to 4 are as follows.

(Dispersion)

Dp1: dispersion Dp1 obtained in Preparation Example 1

Dp2: dispersion Dp2 obtained in Preparation Example 2

(Viscosity Modifier)

PG: propylene glycol (Penetrant)

1,2-HD: 1,2-hexanediol (PH Adjuster)

TEA: triethanolamine (Silicone-Based Surfactant)

TG450: TEGO Glide 450

SAG005: Silface SAG005

Surfactant A: BYK-new product 1 general grade described in the document published on Jun. 22, 2020

Surfactant B: surfactant B obtained in Synthesis Example 1

TW270: TEGO wet 270

(Hydrophobic Organic Solvent)

CS-12: 2,2,4-trimethyl-1,3-pentanediol monoisobutyrate (C log P value: 2.74)

DBDG: dibutyl diglycol (C log P value: 2.63)

1,2-ND: 1,2-nonanediol (C log P value: 2.11)

EGmHE: ethylene glycol monohexyl ether (C log P value: 1.90)

CS-16: 2,2,4-trimethyl-1,3-pentanediol diisobutyrate (C log P value: 4.49)

1,2-DD: 1,2-dodecanediol (C log P value: 3.70)

Examples 1 to 12 and Comparative Examples 1 to 13

The ink compositions C1 to C18 and Y1 to Y20 prepared as described above were each stored at room temperature for 4 weeks, and then combined as first and second ink compositions as shown in Tables 5 to 8 below to prepare ink sets of Examples 1 to 12 and Comparative Examples 1 to 13.

(A) Evaluation of Initial Intercolor Bleeding (1) Preparation of Test Specimen 1

Using the ink sets of Examples 1 to 12 and Comparative Examples 1 to 13, one straight-line image (second image) at settings of 100% of the second ink composition and a line width of 1.0 mm was printed so as to overlap a solid image (first image) formed with 100% of the first ink composition, to obtain printed images. The printing was performed in the order of the first ink composition and the second ink composition using a printer equipped with two heads of KJ4B, which is an inkjet head from KYOCERA Corporation, and using "OK topkote+" from Oji Paper Co., Ltd. as a printing medium under the conditions of a frequency of 10 kHz and a binary mode (medium droplet). The two inkjet heads were mounted on the printer in the order of the first ink composition and the second ink composition from the upstream side in the feeding direction of the printing media. In this printing, the distance of the inkjet heads each filled with the first ink composition or the second ink composition was set to 90 mm. The resulting printed images were dried for 3 seconds in an IR heater set to 100° C. to obtain test specimen 1. Then, the line width of the second image formed on the first image on the test specimen 1 was measured. A printed image evaluation apparatus PIAS-II from QEA Inc. was used for measurement of the line width.

(2) Preparation of Test Specimen 2

Using the ink sets of Examples 1 to 12 and Comparative Examples 1 to 13, a solid image (second image) of 100% of the second ink composition was printed so as to overlap a straight-line image (first image) of a line width of 1.0 mm formed with 100% of the first ink composition to obtain a printed image. The printer, the printing conditions, and the printing medium were the same as in (1). The resulting printed image was dried in the same manner as in (1) to obtain test specimen 2. Then, the line width of the first image observed through the second image on the test specimen 2 was measured.

(3) Evaluation

The ratio of the line width (%) was calculated according to the equation below, and the evaluation was made according to the four evaluation criteria below. A smaller ratio of the line width means greater suppression of intercolor bleeding. The results of the evaluation are shown in Tables 5 to 8 below.

Ratio of line width (%)=100×(measurement of line width)−1.0 mm)/1.0 mm

—Evaluation Criteria—

A: the ratio being 25% or less

B: the ratio being 26 to 50%

C: the ratio being 51 to 100%

D: the ratio being 101% or more

TABLE 5

| | Example | | | | | |
|---|---|---|---|---|---|---|
| | 1 | 2 | 3 | 4 | 5 | 6 |
| First ink composition | C1 | C2 | C1 | C3 | C10 | C8 |
| Amount of silicone-based surfactant A1 | 0.50 | 0.50 | 0.50 | 0.50 | 0.50 | 0.50 |
| Amount of hydrophobic organic solvent A2 | 0.80 | 1.00 | 0.80 | 1.40 | 0.80 | 0.80 |

TABLE 5-continued

| | Example | | | | | |
|---|---|---|---|---|---|---|
| | 1 | 2 | 3 | 4 | 5 | 6 |
| Second ink composition | Y2 | Y2 | Y3 | Y4 | Y9 | Y7 |
| Amount of silicone-based surfactant B1 | 0.50 | 0.50 | 1.00 | 1.00 | 0.50 | 0.50 |
| Amount of hydrophobic organic solvent B2 | 1.40 | 1.40 | 0.80 | 1.40 | 1.40 | 1.40 |
| 0.5 × (B1 − A1) + (B2 − A2) | 0.60 | 0.40 | 0.25 | 0.25 | 0.60 | 0.60 |
| Evaluation of test specimen 1 | A | A | A | A | A | A |
| Evaluation of test specimen 2 | A | A | A | A | A | A |

TABLE 6

| | Example | | | | | |
|---|---|---|---|---|---|---|
| | 7 | 8 | 9 | 10 | 11 | 12 |
| First ink composition | C9 | C13 | C14 | C1 | C1 | C17 |
| Amount of silicone-based surfactant A1 | 0.50 | 0.50 | 0.50 | 0.50 | 0.50 | 0.50 |
| Amount of hydrophobic organic solvent A2 | 0.80 | 0.80 | 0.80 | 0.80 | 0.80 | 0.80 |
| Second ink composition | Y8 | Y12 | Y13 | Y16 | Y17 | Y18 |
| Amount of silicone-based surfactant B1 | 0.50 | 0.50 | 0.50 | 0.50 | 0.50 | 0.50 |
| Amount of hydrophobic organic solvent B2 | 1.40 | 1.40 | 1.40 | 1.50 | 0.85 | 1.40 |
| 0.5 × (B1 − A1) + (B2 − A2) | 0.60 | 0.60 | 0.60 | 0.70 | 0.05 | 0.40 |
| Evaluation of test specimen 1 | A | A | A | A | A | A |
| Evaluation of test specimen 2 | A | A | A | A | A | A |

TABLE 7

| | Comparative Example | | | | | | |
|---|---|---|---|---|---|---|---|
| | 1 | 2 | 3 | 4 | 5 | 6 | 7 |
| First ink composition | C1 | C1 | C4 | C5 | C11 | C12 | C15 |
| Amount of silicone-based surfactant A1 | 0.50 | 0.50 | 1.00 | 1.00 | 0.50 | 0.50 | 0.50 |
| Amount of hydrophobic organic solvent A2 | 0.80 | 0.80 | 0.80 | 1.40 | 0.80 | 0.80 | 0.80 |
| Second ink composition | Y1 | Y4 | Y1 | Y2 | Y10 | Y11 | Y14 |
| Amount of silicone-based surfactant B1 | 0.50 | 1.00 | 0.50 | 0.50 | 0.50 | 0.50 | 0.50 |
| Amount of hydrophobic organic solvent B2 | 0.80 | 1.40 | 0.80 | 1.40 | 1.40 | 1.40 | 1.40 |
| 0.5 × (B1 − A1) + (B2 − A2) | 0.00 | 0.85 | −0.25 | −0.25 | 0.60 | 0.60 | 0.60 |
| Evaluation of test specimen 1 | B | A | C | C | B | B | B |
| Evaluation of test specimen 2 | A | C | A | A | A | A | A |

TABLE 8

| | Comparative Example | | | | | |
|---|---|---|---|---|---|---|
| | 8 | 9 | 10 | 11 | 12 | 13 |
| First ink composition | C16 | C6 | C7 | Y2 | C1 | C18 |
| Amount of silicone-based surfactant A1 | 0.50 | 0.00 | 0.50 | 0.50 | 0.50 | 0.50 |
| Amount of hydrophobic organic solvent A2 | 0.80 | 0.80 | 0.00 | 1.40 | 0.80 | 0.80 |
| Second ink composition | Y15 | Y5 | Y6 | C1 | Y19 | Y20 |
| Amount of silicone-based surfactant B1 | 0.50 | 0.00 | 0.80 | 0.50 | 0.50 | 0.50 |
| Amount of hydrophobic organic solvent B2 | 1.40 | 1.40 | 0.00 | 0.80 | 1.55 | 1.40 |
| 0.5 × (B1 − A1) + (B2 − A2) | 0.60 | 0.60 | 0.15 | −0.60 | 0.75 | 0.40 |
| Evaluation of test specimen 1 | A | A | B | D | A | A |
| Evaluation of test specimen 2 | A | C | A | A | B | A |

Examples 13 to 24 and Comparative Examples 14 to 26

The first ink composition in Tables 9 to 12 were stored in a thermostatic chamber at 60° C. for four weeks to perform an accelerated test. The second ink composition were stored at room temperature for four weeks without the accelerated test. The storage at 60° C. for four weeks in the accelerated test corresponds to a storage at 25° C. for one year. The first ink composition subjected to the accelerated test and the second ink composition stored at room temperature were combined as shown in Tables 9 to 12 to prepare ink sets of Examples 13 to 24 and Comparative Examples 14 to 26.

(B) Evaluation of Intercolor Bleeding after Accelerated Test (1) Preparation of Test Specimen 3

Using the ink sets of Examples 13 to 24 and Comparative Examples 13 to 26, one straight-line image (second image) at settings of 100% of the second ink composition and a line width of 1.0 mm was printed so as to overlap a solid image (first image) formed with 100% of the first ink composition, to obtain a printed image. The printer, the printing condition, and the printing medium were the same as in (1) of the section (A) above. The resulting printed image was dried for 3 seconds in an IR heater set at 100° C. to obtain test specimen 3. Then, the line width of the second image formed on the first image on the test specimen 3 was measured.

(2) Evaluation

The ratio of the line width (%) was calculated according to the equation below, and the evaluation was made according to the four evaluation criteria below. A smaller ratio of the line width means greater suppression of intercolor bleeding regardless of the storage period. The results of the evaluation are shown in Tables 9 to 12 below.

$$\text{Ratio of line width (\%)}=100\times\{(\text{measurement of line width})-(\text{measurement of line width obtained in (1) of section }(A))\}/(\text{measurement of line width obtained in (1) of section }(A))$$

—Evaluation Criteria—

A: the ratio being 25% or less

B: the ratio being 26 to 50%

C: the ratio being 51 to 100%

D: the ratio being 101% or more

TABLE 9

| | Example | | | | | |
|---|---|---|---|---|---|---|
| | 13 | 14 | 15 | 16 | 17 | 18 |
| First ink composition | C1 | C2 | C1 | C3 | C10 | C8 |
| Amount of silicone-based surfactant Al | 0.50 | 0.50 | 0.50 | 0.50 | 0.50 | 0.50 |
| Amount of hydrophobic organic solvent A2 | 0.80 | 1.00 | 0.80 | 1.40 | 0.80 | 0.80 |
| Second ink composition | Y2 | Y2 | Y3 | Y4 | Y9 | Y7 |
| Amount of silicone-based surfactant B1 | 0.50 | 0.50 | 1.00 | 1.00 | 0.50 | 0.50 |
| Amount of hydrophobic organic solvent B2 | 1.40 | 1.40 | 0.80 | 1.40 | 1.40 | 1.40 |
| 0.5 × (B1 − A1) + (B2 − A2) | 0.60 | 0.40 | 0.25 | 0.25 | 0.60 | 0.60 |
| Evaluation of test specimen 3 | A | A | A | A | A | A |

TABLE 10

| | Example | | | | | |
|---|---|---|---|---|---|---|
| | 19 | 20 | 21 | 22 | 23 | 24 |
| First ink composition | C9 | C13 | C14 | C1 | C1 | C17 |
| Amount of silicone-based surfactant A1 | 0.50 | 0.50 | 0.50 | 0.50 | 0.50 | 0.50 |
| Amount of hydrophobic organic solvent A2 | 0.80 | 0.80 | 0.80 | 0.80 | 0.80 | 0.80 |
| Second ink composition | Y8 | Y12 | Y13 | Y16 | Y17 | Y18 |
| Amount of silicone-based surfactant B1 | 0.50 | 0.50 | 0.50 | 0.50 | 0.50 | 0.50 |
| Amount of hydrophobic organic solvent B2 | 1.40 | 1.40 | 1.40 | 1.50 | 0.85 | 1.40 |
| 0.5 × (B1 − A1) + (B2 − A2) | 0.60 | 0.60 | 0.60 | 0.70 | 0.05 | 0.40 |
| Evaluation of test specimen 3 | A | A | A | A | A | A |

TABLE 11

| | Comparative Example | | | | | | |
|---|---|---|---|---|---|---|---|
| | 14 | 15 | 16 | 17 | 18 | 19 | 20 |
| First ink composition | C1 | C1 | C4 | C5 | C11 | C12 | C15 |
| Amount of silicone-based surfactant A1 | 0.50 | 0.50 | 1.00 | 1.00 | 0.50 | 0.50 | 0.50 |
| Amount of hydrophobic organic solvent A2 | 0.80 | 0.80 | 0.80 | 1.40 | 0.80 | 0.80 | 0.80 |
| Second ink composition | Y1 | Y4 | Y1 | Y2 | Y10 | Y11 | Y14 |
| Amount of silicone-based surfactant B1 | 0.50 | 1.00 | 0.50 | 0.50 | 0.50 | 0.50 | 0.50 |
| Amount of hydrophobic organic solvent B2 | 0.80 | 1.40 | 0.80 | 1.40 | 1.40 | 1.40 | 1.40 |
| 0.5 × (B1 − A1) + (B2 − A2) | 0.00 | 0.85 | −0.25 | −0.25 | 0.60 | 0.60 | 0.60 |
| Evaluation of test specimen 3 | A | A | A | A | D | C | A |

TABLE 12

| | Comparative Example | | | | | |
|---|---|---|---|---|---|---|
| | 21 | 22 | 23 | 24 | 25 | 26 |
| First ink composition | C16 | C6 | C7 | Y2 | C1 | C18 |
| Amount of silicone-based surfactant Al | 0.50 | 0.00 | 0.50 | 0.50 | 0.50 | 0.50 |
| Amount of hydrophobic organic solvent A2 | 0.80 | 0.80 | 0.00 | 1.40 | 0.80 | 0.80 |
| Second ink composition | Y15 | Y5 | Y6 | C1 | Y19 | Y20 |
| Amount of silicone-based surfactant B1 | 0.50 | 0.00 | 0.80 | 0.50 | 0.50 | 0.50 |
| Amount of hydrophobic organic solvent B2 | 1.40 | 1.40 | 0.00 | 0.80 | 1.55 | 1.40 |
| 0.5 × (B1 − A1) + (B2 − A2) | 0.60 | 0.60 | 0.15 | −0.60 | 0.75 | 0.40 |
| Evaluation of test specimen 3 | B | A | A | A | A | B |

As shown in Tables 5 and 6 above, the ink sets of Examples 1 to 12 resulted in suppression of the intercolor bleeding to 25% or less. This confirmed that the ink sets of Examples 1 to 12 had excellent performance in suppressing the intercolor bleeding after a short storage period from the preparation of the first and second ink compositions and in a fresh state. In addition, as shown in Tables 9 and 10 above, the ink sets of Examples 13 to 24 also resulted in suppression of the intercolor bleeding to 25% or less. This confirmed that the ink sets of Examples 13 to 24 resulted in a reduction of the severity of the intercolor bleeding even for the first and second ink compositions having different storage periods.

On the other hand, as shown in Tables 7, 8, 11, and 12 above, it was confirmed that the ink sets of Comparative Examples 1 to 26 gave the results inferior to those of the ink sets of Examples in the evaluation of the intercolor bleeding in at least one of the case of the same storage period and the case of different storage periods.

The invention claimed is:

1. An ink set comprising:

a first ink composition comprising a first colorant, a first surfactant, a first hydrophobic organic solvent, and water; and a second ink composition comprising a second colorant, a second surfactant, a second hydrophobic organic solvent, and water, and applied to a first image formed using the first ink composition to form a second image, wherein the first and second surfactants are each independently a silicone-based surfactant represented by formula (1):

(1)

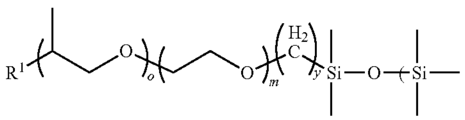

-continued

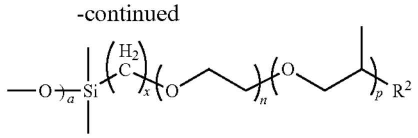

wherein in the formula (1), $R^1$ and $R^2$ each independently represents a hydrogen atom, a hydroxy group, an alkyl group having 1 to 6 carbon atoms, or an alkoxy group having 1 to 3 carbon atoms, a is an integer of 1 to 80, x and y are each independently an integer of 1 to 4, m and n are each independently an integer of 1 to 50, o and p are each independently an integer of 0 to 40, a sum of m and n is 2 to 100, and a sum of o and p is 0 to 80, the first and second hydrophobic organic solvents each have a water-octanol partition coefficient of 2.00 or more and less than 3.50, and when a content of the first surfactant in the first ink composition is designated as A1 (% by mass), a content of the first hydrophobic organic solvent in the first ink composition is designated as A2 (% by mass), a content of the second surfactant in the second ink composition is designated as B1 (% by mass), and a content of the second hydrophobic organic solvent in the second ink composition is designated as B2 (% by mass), a condition expressed by equation (2) is satisfied:

$$0.05 \leq [0.5\times(B1-A1)+(B2-A2)] \leq 0.70 \quad (2).$$

2. The ink set according to claim 1, wherein in the formula (1), m and n are each independently an integer of 1 to 30.

3. The ink set according to claim 1, wherein one or both of the first ink composition and the second ink composition comprise a binder.

4. The ink set according to claim 3, wherein the binder is at least one selected from the group consisting of a wax and a (meth)acrylic polymer.

5. The ink set according to claim 4, wherein the wax is at least one selected from the group consisting of a polyalkylene wax, an oxidized polyalkylene wax, and a paraffin wax.

6. The ink set according to claim 4, wherein the wax is an oxidized polyethylene wax.

7. An inkjet printing method using the ink set according to claim 1, the method comprising:

ejecting droplets of the first ink composition, and attaching the droplets to a printing medium to form a first image; and ejecting droplets of the second ink composition, and attaching the droplets to the printing medium having the first image formed thereon to form a second image.

8. An ink and medium set comprising the ink set according to claim 1, and a printing medium.

9. A printed medium comprising a first image formed by applying the first ink composition comprised in the ink set according to claim 1, and a second image formed on the first image by applying the second ink composition comprised in the ink set.

* * * * *